May 2, 1961  M. R. MILLER ET AL  2,982,569
CONCRETE PIPE JOINT

Filed July 3, 1957  2 Sheets-Sheet 1

INVENTORS.
Marion Robert Miller & Raymond T. Grundy.
BY Robert L. Kahn.
Attorney.

May 2, 1961　　　M. R. MILLER ET AL　　　2,982,569
CONCRETE PIPE JOINT

Filed July 3, 1957　　　　　　　　　　　　2 Sheets-Sheet 2

INVENTORS.
Marion Robert Miller & Raymond J. Grundy
BY Robert L. Kahn
Attorney

United States Patent Office 2,982,569
Patented May 2, 1961

2,982,569
CONCRETE PIPE JOINT

Marion Robert Miller, Fort Wayne, Ind., and Raymond J. Grundy, Waterford, Mich., assignors to Press-Seal Gasket Corporation, Fort Wayne, Ind.

Filed July 3, 1957, Ser. No. 669,769
5 Claims. (Cl. 285—230)

This invention relates to a concrete pipe joint and method for making the same. The invention is particularly concerned with the bell and spigot construction of concrete pipes for providing joints which may utilize a gasket and result in a water tight and mechanically strong joint. While the present application may be applied to pipes of various sizes, it is particularly useful for concrete pipe of the reinforced prefabricated type having a diameter of from about 12 inches to as much as 12 feet and more.

Concrete pipe of the type to which this invention relates usually comes in definite lengths, one end of a pipe length being shaped to provide a bell and the other end of the pipe length being shaped to provide a spigot. In laying pipe of this character, it is customary to lay successive pipe lengths, the new pipe length being usually disposed spigot end first into the bell end of the pipe length already in position in a trench. Prior to disposing the spigot into a bell, a gasket is cemented or disposed around a suitable portion of the spigot.

Conventional joints using conventional gaskets have frequently resulted in failure due to the tendency of the gasket to be rolled on the spigot away from the spigot end and toward the body of the pipe. When the gasket is thus rolled, it is out of the position where it normally should be and thus can not function effectively.

This tendency of rolling of a gasket is particularly pronounced because of the cocking of a new pipe length into the bell of a pipe length already in position. This cocking is preliminary to inserting the spigot of the new pipe into full final position inside the bell of the pipe length already laid. Usually the top part of the spigot is inserted into the top part of the bell with the new pipe length being cocked at an angle to the pipe length already in position. Thus the gasket at the top of the spigot is frequently rolled over and this rolling tendency of the gasket is communicated to the remainder of the gasket around the spigot when the new pipe length is positioned down generally parallel to the pipe length.

In addition to the above difficulties inherent in many well known types of pipe joints, difficulty has been experienced after a pipe has been laid due to ground movement. It is important that a pipe joint endow the pipe line with sufficient flexibility so that the components of the pipe line consisting of individual pipe lengths should have some freedom of movement so that the pipe line may adapt itself to some of the ground forces tending to move the individual pipe lengths out of a straight line.

A pipe joint embodying the present invention is particularly useful in endowing a pipe length with highly desirable characteristics of promoting correct position during laying of the pipe line and imparting some flexibility to the pipe lengths, after laying, so that the pipe line may adapt itself to various ground forces.

While the new pipe joint embodying the present invention may be used with various kinds of gaskets, the new joint is particularly useful with a gasket disclosed and claimed in the co-pending United States application of Joseph E. Miller, Serial No. 269,401, filed February 1, 1952, now Reissue Patent 24,799, granted March 15, 1960, and assigned to the assignee of the present application. For convenience therefore, the new invention will be described in connection with such gaskets although it will be understood that variations in gasket constructions will be provided without losing the advantages of the new joint construction. In order that the invention may be understood, it will now be disclosed in connection with the drawings wherein an embodiment of the new joint and apparatus for making the new joint is disclosed. It is understood however that some variations from the construction as disclosed are permissible without departing from the scope of the invention.

Referring now to the drawings.

Figure 1:
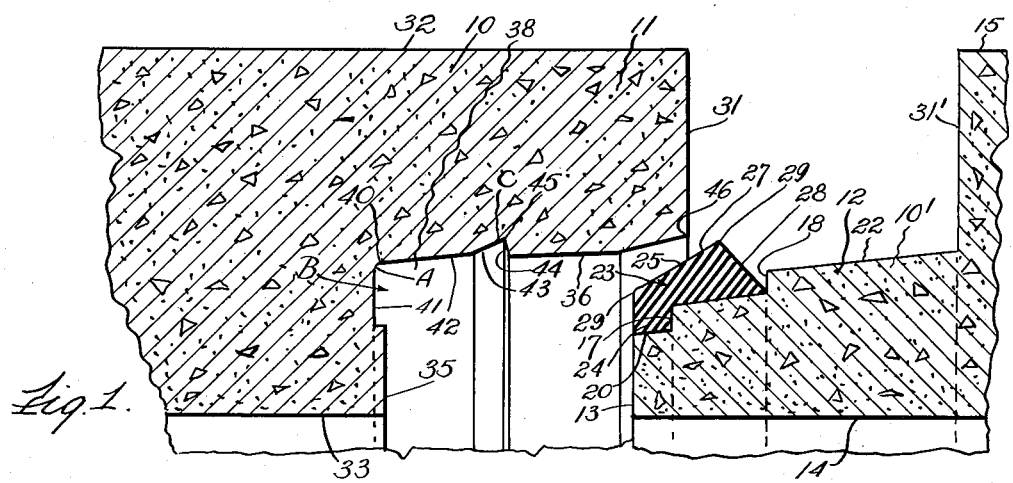
Figure 1 illustrates a joint with a gasket positioned over the spigot end, the adjacent pipe lengths being prepared for telescoping.

Pipe lengths 10 and 10' may be of concrete having suitable longitudinal and circular reinforcement in accordance with conventional practice. No attempt is made to show such steel reinforcement, it being understood that such pipe may embody various constructions. Pipe lengths 10 and 10' are each provided with bell and spigot ends in accordance with conventional practice. Pipe length 10 is illustrated as having bell end 11 while pipe length 10' is illustrated as having spigot end 12.

Spigot end 12 of each pipe length has inner or forward end face 13, the pipe having inner surface 14 and outer surface 15. The surface of the spigot beginning with inner end face 13 is provided with steps 17 and 18 extending radially outwardly. Step 17 is disposed between tapered surface 20 extending between inner end face 13 and step 17. Between step 17 and 18 is tapered surface 21. Between step 18 and outer pipe surface 15 is tapered surface 22. Outer or rearward end face 31' extends outwardly from tapered surface 22 to outer surface 15.

Inner pipe surface 14 is parallel to the axis of the pipe. As is illustrated in the drawing, surfaces 22 and 21 are generally parallel to each other and are at an angle to inner pipe surface 14. This angle may be something of the order of a few degrees, such as for example 3 to 5 degrees of inclination. It is understood that the taper is in the direction of inner end face 13 with the smaller end of the tapered surface nearer the end face. Tapered surface 20 however preferably has a larger angle of taper than the angle of surfaces 21 and 22. The angle of surface 20 may be of the order of from about 7 or 8 degrees up to as much as 11 or 12 degrees.

The width of surface 20—this is the dimension extending between end face 13 and step 17 along tapered surface 20—is generally substantially shorter than the corresponding dimension of surface 21. The height of steps 17 and 18 will be about equal and will preferably be somewhat less than the width of surface 20.

Cemented around the stepped end of the spigot is gasket 23 of suitable rubber and having the shape illustrated. Gasket 23 has heel portion 24 and body portion 25. The inside or bottom portion of gasket 23 is shaped to conform to tapered surfaces 20 and 21 and step 17. Body 25 of the gasket has surfaces 27 and 28 which meet at edge 29. Surfaces 27 and 28 extend toward each other and outwardly away from the axis of the pipe. Heel portion 24 of the gasket merges with body portion 25 to provide rounded nose portion 29.

The spigot construction with the steps and gasket 23 are disclosed and claimed in the reissue patent previously identified. While it is preferred to use this spigot and gasket construction in combination with the new bell construction, substantial changes in both the spigot and gasket may be made while still utilizing the advantages of the present invention.

Cooperating with the spigot and gasket is bell 11. Bell 11 has outer or forward free end surface 31, outer pipe surface 32 and inner or rearward pipe surface 33. Inner pipe surface 33 has inner end face 35 adjacent the end of the inside surface, this inner face extending radially outwardly from the inner surface of the pipe for a short distance. From the inside edge of end face 31 there is provided outer portion 36 of the bell, this being of conventional construction and in section having the shape of either a straight or curved or broken line tapering or extending outwardly toward free end 31.

Between inner end face 35 and outer bell portion 36 there is provided annular pocket portion 38. Annular pocket portion 38 extends inwardly from inner bell corner 40 toward inner end face 35. This portion 41 of the annular pocket may be termed the radial portion. From inner bell corner 40 the annular pocket 38 extends toward outer bell surface 36. From inner bell portion 40, the annular pocket has a longitudinal extension consisting of outwardly tapering surface 42 terminating in blind pocket 43 extending annularly and outwardly from the axis of the pipe.

Annular blind pocket 43 has radially extending edge 44 which forms the end boundary for blind annular pocket 43. Pocket surface 44 has edge 45 which is the outermost (with respect to the pipe axis) edge of the pocket and edge 45 is generally in line with inner edge 46 of the outer end face 31 of the bell.

Surfaces 42 and 36 of the bell taper outwardly toward end face 31 and the angle of taper of both of these surfaces may be substantially equal and are preferably about equal to the angle of taper of surface 21 of the spigot end of the pipe. If desired, radially extending portion 41 of the annular pocket 38 may be omitted.

Figure 2:
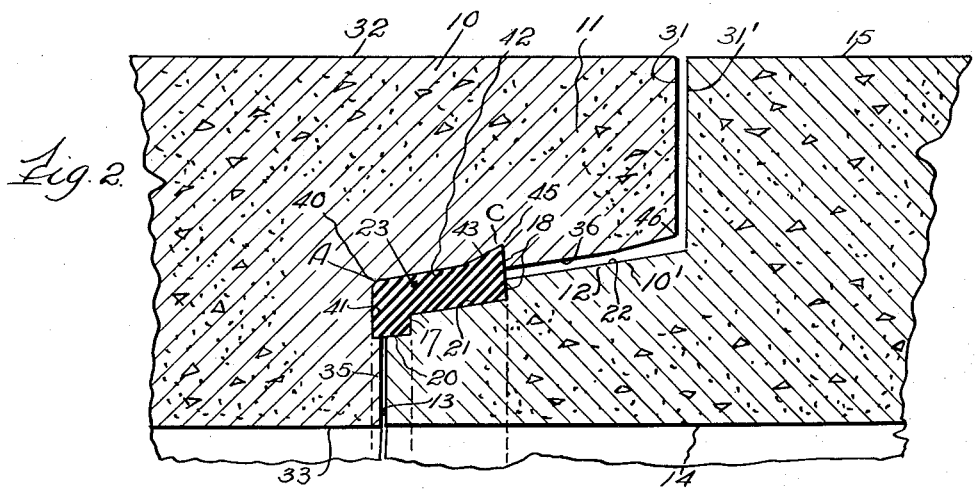
Figure 2 shows a detail of the two ends of two pipe lengths telescoped into position to form a pipe joint.

When the bell and spigot are telescoped into position to provide a joint as illustrated in Figure 2, gasket 23 will be deformed as illustrated in Figure 2 and will be locked into position. Step 18 of the spigot prevents the construction from being rolled over. Step 17 also cooperates with heel portion 24 of the gasket to prevent roll-over. The portion of the gasket adjacent to 29 is forced into blind annular pocket 43. Annular pocket 38 is so dimensioned that radial part 44 of the blind annular pocket 43 will receive the front part of the gasket when the spigot is forced into position in the bell.

The annular space between surfaces 13 and 35 of the spigot and bell respectively and the annular region between outer end faces 31 and 31' of the adjoining pipe ends are generally filled with grout or any other type of material. The pipe is provided with flexibility and is sealed by virtue of the construction of the bell having the annular pocket and locking a gasket into position. Usually the outer surface 27 and 20 of the gasket will be wet with a suitable lubricant such as bentonite or other slippery mud when or just prior to the time when the spigot is inserted into position.

Figure 3:
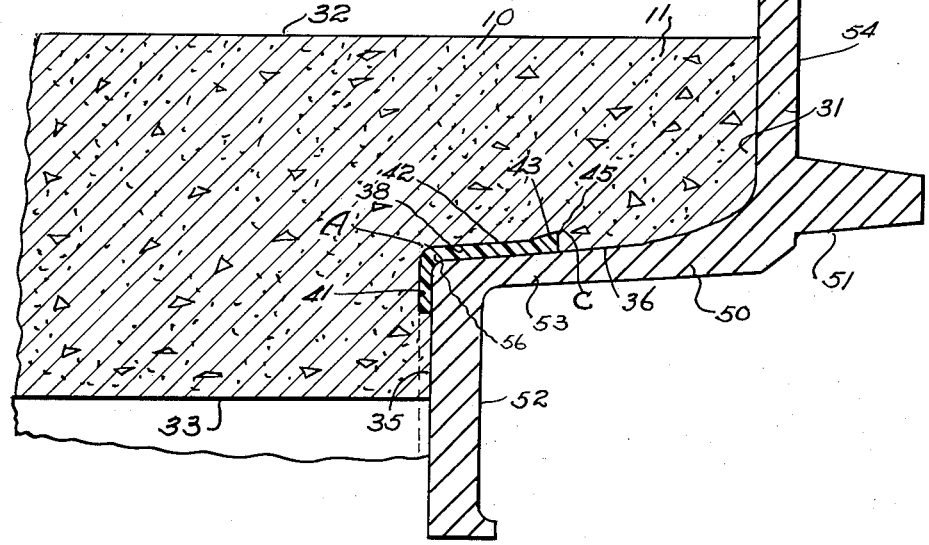
Figure 3 is a detail of a portion of the apparatus or form used in the manufacture of the new bell end part of the joint.
Figure 4:
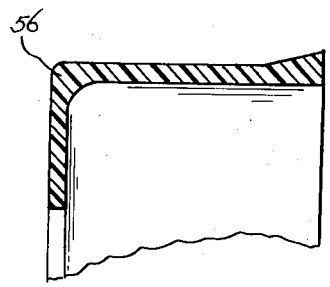
Figure 4 is a detail of the plastic ring insert used in connection with the apparatus of Figure 3.

A concrete pipe having a bell provided with an inner annular pocket may be made in a number of ways. One method of making the same will now be disclosed. Referring to Figures 3 and 4, pipe 10 and bell 11 are formed by pallet ring generally indicated by 50. Pallet ring 50 forms part of a pipe mold which may be of well known construction. Pallet ring 50 may have driving ring portion 51 and may have a generally Z-shaped portion as shown consisting of parts 52, 53 and 54. It is understood that pallet ring 50 forms a complete circle and may be either in one piece or in a number of pieces if desired. While pallet ring 50 may have its surface properly contoured to provide the inner annular pocket in the bell, it is preferred to use ring 56 of rubber, plastic or any other suitable flexible material. Ring 56 has a cross section illustrated in Figures 3 and 4, Figure 4 showing an enlarged view of the ring section. Ring 56 has the shape shown and when disposed in position on the pallet ring as illustrated in Figure 3 will shape the concrete to provide annular pocket 38 in the bell. It is understood that the outer surface 32 of the concrete pipe will be formed by a steel cylinder not shown and being part of the entire form for making the concrete pipe.

The spigot end of the pipe will be shaped by pallet rings of appropriate shape. A complete form for making a concrete pipe will be disposed with the pipe axis either vertical or horizontal. As a rule, the form is rotated at high speed around the axis of the pipe with the wet mix disposed in the form. Centrifugal force tends to drive the mix against the outer walls of the form and after the mix is dense and can hold its shape, the form including the mix may be disposed in suitable steam heated chambers for curing the concrete. In as much as the manufacture of concrete pipe is well known in the art all of the steps in the manufacture thereof and all of the apparatus used in the manufacture thereof need not be described.

What is claimed is:

1. A joint for concrete pipe comprising: cooperable male and female concrete pipe members having respective aligned inner surfaces defining a bore and outer surfaces; said male member having a forward end face extending generally radially outward from said inner surface, said male member having at least two annular surfaces connected by a generally radially outwardly extending ledge portion, the forward annular surface being joined to said forward end face, at least the rearward one of said annular surfaces tapering outwardly and rearwardly, the rearward annular surface being radially outermost, said female member having a rearward end face extending generally radially outward from said inner surface and a forward end face extending generally radially inward from said outer surface and spaced longitudinally from said rearward end face, said female member having an inner annular surface joining said end faces thereof at least a portion of which tapers inwardly and rearwardly, said forward end face of said male member opposing said rearward end face of said female member and said male and female annular surfaces defining an annular space therebetween when said members are assembled to form said joint; and a preformed annular self-supporting gasket of flexible resilient material, said gasket having an annular body portion with a generally wedge-shaped cross-section having forward and rear ends, said body portion having an inner annular surface and an outer annular surface at least a portion of which tapers outwardly and rearwardly with a taper greater than the taper of said portion of said female member inner annular surface, said body portion at least adjacent its rear end normally being radially thicker than the radial width of said annular space, said gasket having an annular flange portion depending from the forward end of said body portion, said flange portion having substantially the same axial length as the axial length of the forward one of said male member annular surfaces and having substantially the same height as the height of said ledge portion, said gasket being seated on said male member with said flange portion overhanging said ledge portion and engaging the same and engaging said forward one of said male member annular surfaces and with said inner annular surface of said body portion engaging the rearward one of said two male member annular surfaces; said inner annular surface of said female member having an annular radially outwardly extending recess formed therein with a forward surface generally in radial alignment with the rear end of said gasket when said joint is assembled; said radially thicker section of said gasket body portion being compressed between said male and female member annular surfaces as said joint is assembled causing said resilient material to cold-flow toward the forward end of said gasket thereby positioning said gasket with the rearward end of said body portion seated in said recess and with the front end of said flange portion engaging said female member rearward end face, and placing said gasket in compression over its entire length between said male and female member annular surfaces and between said female member rearward end face and said forward surface of said recess when said joint is completely assembled to provide a tight seal for said joint.

2. The combination of claim 1 wherein said rearward end face of said female member has an annular undercut portion with a rear wall extending radially outwardly to said female member inner annular surface, a portion of said gasket flange portion being seated in said undercut portion and the front end of said flange portion being compressed against said rear wall of said undercut portion when said joint is completely assembled.

3. The combination of claim 2 wherein said undercut portion of said female member rearward end face has an annular bottom surface in general axial alignment with said male member forward annular surface and with said portion of said gasket flange portion being seated thereon.

4. The combination of claim 1 wherein said female member inner annular surface recess has an axial extent substantially less than that of said gasket, said recess being formed by two surfaces defining a triangular cross section with the rearward surface tapering outwardly and forwardly and the forward surface extending generally radially outward to its junction with the rearward surface.

5. The combination of claim 1 wherein said male member has three annular surfaces respectively connected by ledge portions, wherein said gasket body portion has its inner annular surface engaging the intermediate one of said male member annular surfaces and its rear end engaging the rearward ledge portion, and wherein said forward surface of said female member inner annular surface recess is in general radial alignment with said rearward ledge portion of said male member whereby said gasket is axially compressed between said female member rearward end face and said rearward ledge portion and said forward surface of said recess.

References Cited in the file of this patent
UNITED STATES PATENTS

| | | |
|---|---|---|
| 1,985,325 | Nathan | Dec. 25, 1934 |
| 2,032,576 | Hering | Mar. 3, 1936 |
| 2,102,072 | Hinderliter | Dec. 14, 1937 |
| 2,223,434 | Trickey | Dec. 3, 1940 |
| 2,401,554 | Davids | June 4, 1946 |
| 2,501,943 | Jack | Mar. 28, 1950 |
| 2,815,228 | Miller | Dec. 3, 1957 |

FOREIGN PATENTS

| | | |
|---|---|---|
| 3,037 | Great Britain | July 11, 1881 |
| 12,138 | Great Britain | May 24, 1906 |
| 114,356 | Australia | Dec. 5, 1941 |
| 217,685 | Australia | Apr. 18, 1957 |